(12) United States Patent
Do et al.

(10) Patent No.: US 9,134,904 B2
(45) Date of Patent: Sep. 15, 2015

(54) DISPLAYING DOCUMENTS TO A PLURALITY OF USERS OF A SURFACE COMPUTER

(75) Inventors: Lydia M. Do, Raleigh, NC (US);
Pamela A. Nesbitt, Tampa, FL (US);
Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1941 days.

(21) Appl. No.: 11/868,474

(22) Filed: Oct. 6, 2007

(65) Prior Publication Data

US 2009/0094515 A1    Apr. 9, 2009

(51) Int. Cl.
*G06F 3/041* (2006.01)
*G06F 3/0488* (2013.01)
*G06Q 10/10* (2012.01)

(52) U.S. Cl.
CPC ............ *G06F 3/04886* (2013.01); *G06Q 10/10* (2013.01)

(58) Field of Classification Search
USPC ........................... 345/173–177; 715/750–753
See application file for complete search history.

(56) References Cited

U.S. PATENT DOCUMENTS

| | | |
|---|---|---|
| 3,873,769 A | 3/1975 | Cotter |
| 4,393,410 A | 7/1983 | Ridge et al. |
| 4,577,058 A | 3/1986 | Collins |
| 4,771,336 A | 9/1988 | Ohtorii |
| 5,574,577 A | 11/1996 | Wally, Jr. et al. |
| 5,630,168 A | 5/1997 | Rosebrugh et al. |
| 5,838,326 A | 11/1998 | Card et al. |
| 6,014,662 A | 1/2000 | Moran et al. |
| 6,561,678 B2 | 5/2003 | Loughrey |
| 6,571,279 B1 | 5/2003 | Herz et al. |
| 6,636,831 B1 | 10/2003 | Profit, Jr. et al. |
| 6,806,636 B2 | 10/2004 | Kang et al. |
| 6,839,669 B1 | 1/2005 | Gould et al. |
| 6,850,252 B1 | 2/2005 | Hoffberg |

(Continued)

FOREIGN PATENT DOCUMENTS

| | | | |
|---|---|---|---|
| DE | 19804028 A1 | 8/1998 | ............... G06K 9/00 |
| EP | 0450196 A1 | 4/1990 | |

(Continued)

OTHER PUBLICATIONS

Ashdown, et al.; "Escritoire: A Personal Projected Display"; IEEE Multimedia, vol. 12, Issue 1; Jan.-Mar. 2005; pp. 34-42.

(Continued)

*Primary Examiner* — Koosha Sharifi-Tafreshi
(74) *Attorney, Agent, or Firm* — VanLeeuwen & VanLeeuwen; Jeffrey S. LaBaw

(57) ABSTRACT

Methods, apparatus, and products are disclosed for displaying documents to a plurality of users of a surface computer, the surface computer comprising a surface, surface computer capable of receiving multi-touch input through the surface and rendering display output on the surface, that include: registering a plurality of users with the surface computer, the plurality of users including a moderator and a plurality of participants; assigning, to each registered user, a portion of the surface for interaction between that registered user and the surface computer; selecting, by the moderator for sharing with the plurality of participants, a document stored in the surface computer; rendering contents of the document on the moderator's assigned portion of the surface; and rendering the contents of the document on each of the participants' portions of the surface.

19 Claims, 3 Drawing Sheets

(56) References Cited

U.S. PATENT DOCUMENTS

| | | | |
|---|---|---|---|
| 6,938,203 B1 | 8/2005 | Dimarco et al. ............... 715/209 |
| 6,970,821 B1 | 11/2005 | Shambaugh et al. |
| 6,982,649 B2 | 1/2006 | Blum et al. |
| 6,999,932 B1 | 2/2006 | Zhou |
| 7,035,804 B2 | 4/2006 | Saindon et al. |
| 7,174,056 B2 | 2/2007 | Silverbrook et al. |
| 7,209,124 B2 | 4/2007 | Hunt et al. |
| 7,441,706 B1 | 10/2008 | Schuessler et al. ...... 235/462.15 |
| 7,830,408 B2 | 11/2010 | Asthana et al. |
| 2002/0178190 A1 | 11/2002 | Pope et al. .................... 707/530 |
| 2002/0191072 A1 | 12/2002 | Henrikson |
| 2003/0066073 A1 | 4/2003 | Rebh |
| 2003/0078840 A1 | 4/2003 | Strunk et al. .................... 705/14 |
| 2003/0142135 A1* | 7/2003 | Hori et al. ..................... 345/781 |
| 2003/0160862 A1 | 8/2003 | Charlier et al. |
| 2003/0204403 A1* | 10/2003 | Browning ..................... 704/270 |
| 2004/0019482 A1 | 1/2004 | Holub |
| 2004/0051644 A1 | 3/2004 | Tamayama et al. |
| 2004/0199597 A1 | 10/2004 | Libbey et al. |
| 2004/0201871 A1 | 10/2004 | Risheq |
| 2004/0237033 A1 | 11/2004 | Woolf et al. |
| 2005/0110964 A1 | 5/2005 | Bell et al. |
| 2005/0149364 A1 | 7/2005 | Ombrellaro |
| 2005/0149620 A1 | 7/2005 | Kirkland et al. ............. 709/207 |
| 2005/0149621 A1 | 7/2005 | Kirkland et al. ............. 709/207 |
| 2005/0154595 A1 | 7/2005 | Bodin |
| 2005/0182680 A1 | 8/2005 | Jones, III |
| 2005/0183023 A1* | 8/2005 | Maruyama et al. ........... 715/759 |
| 2006/0001650 A1 | 1/2006 | Robbins et al. |
| 2006/0036944 A1 | 2/2006 | Wilson .......................... 715/702 |
| 2006/0073891 A1 | 4/2006 | Holt |
| 2006/0117669 A1 | 6/2006 | Baloga et al. |
| 2006/0126128 A1 | 6/2006 | Ahmed et al. |
| 2006/0132501 A1 | 6/2006 | Nonaka et al. |
| 2006/0146034 A1 | 7/2006 | Chen et al. |
| 2006/0176524 A1 | 8/2006 | Willrich |
| 2006/0203208 A1 | 9/2006 | Thielman et al. |
| 2006/0204030 A1 | 9/2006 | Kogure et al. |
| 2006/0267966 A1 | 11/2006 | Grossman et al. |
| 2006/0287963 A1 | 12/2006 | Steeves et al. |
| 2006/0294247 A1* | 12/2006 | Hinckley et al. .............. 709/228 |
| 2007/0005500 A1 | 1/2007 | Steeves et al. |
| 2007/0026372 A1 | 2/2007 | Huelsbergen |
| 2007/0033637 A1 | 2/2007 | Yami et al. ......................... 726/2 |
| 2007/0055929 A1 | 3/2007 | Giannetti et al. |
| 2007/0079249 A1 | 4/2007 | Pall et al. ...................... 715/758 |
| 2007/0083666 A1 | 4/2007 | Apelbaum |
| 2007/0143103 A1 | 6/2007 | Asthana et al. |
| 2007/0143624 A1 | 6/2007 | Steeves |
| 2007/0143690 A1* | 6/2007 | Nakajima et al. ............. 715/750 |
| 2007/0156811 A1 | 7/2007 | Jain et al. |
| 2007/0201745 A1 | 8/2007 | Wang et al. |
| 2007/0220444 A1* | 9/2007 | Sunday et al. ................ 715/788 |
| 2007/0288599 A1 | 12/2007 | Saul et al. ...................... 709/218 |
| 2008/0028321 A1 | 1/2008 | Weksler et al. |
| 2008/0066014 A1 | 3/2008 | Misra |
| 2008/0088593 A1 | 4/2008 | Smoot |
| 2008/0122803 A1 | 5/2008 | Izadi et al. |
| 2008/0127302 A1 | 5/2008 | Qvarfordt et al. |
| 2008/0168403 A1 | 7/2008 | Westerman et al. |
| 2008/0192059 A1* | 8/2008 | Kennedy ....................... 345/537 |
| 2008/0198138 A1* | 8/2008 | McFarlane et al. ........... 345/173 |
| 2008/0214233 A1* | 9/2008 | Wilson et al. ............... 455/556.1 |
| 2008/0270230 A1 | 10/2008 | Hendrickson et al. |
| 2008/0281851 A1 | 11/2008 | Izadi et al. ..................... 707/102 |
| 2008/0288862 A1* | 11/2008 | Smetters et al. .............. 715/255 |
| 2009/0002327 A1 | 1/2009 | Wilson et al. |
| 2009/0085877 A1 | 4/2009 | Chang et al. .................. 345/173 |
| 2009/0113294 A1 | 4/2009 | Sanghavi et al. |
| 2009/0138723 A1 | 5/2009 | Nyang et al. |
| 2009/0150983 A1 | 6/2009 | Saxena et al. |
| 2009/0328163 A1 | 12/2009 | Preece |

FOREIGN PATENT DOCUMENTS

| | | |
|---|---|---|
| EP | 0543566 A2 | 11/1992 |
| EP | 1 315 071 A | 5/2003 |
| EP | 1 621 989 A2 | 2/2006 |
| EP | 1621989 | 2/2006 |
| JP | 2000/148396 | 5/2000 |
| JP | 2000 148396 A | 5/2000 |
| JP | 2006139615 A * | 6/2006 |
| WO | WO 01/01391 A1 | 1/2001 |
| WO | WO 03/036415 A2 | 5/2003 |

OTHER PUBLICATIONS

PCT Search Report and Written Opinion, Feb. 5, 2009; PCT Application No. PCT/EP2008/063006.

Microsoft: "Microsoft Launches New Product Category: Surface Computing Comes to Life in Restaurants, Hotels, Retail Locations and Casino Resorts" Microsoft Website, [Online] May 29, 2007, p. 13, XP00251268, Carlsbad, California, US.

PCT Search Report; Dec. 29, 2008; PCT Application No. PCT/EP2008/063007.

Bohte, et al.; "Market-Based Recommendation: Agents that Compete for Consumer Attention"; Nov. 2004; pp. 420-448; vol. 4, No. 4; ACM Transactions on Internet Technology; Broadway, New York.

Lemon, et al.; "Multithreaded Context for Robust Conversational Interfaces: Context-Sensitive Speech Recognition and Interpretation of Corrective Fragments"; Sep. 2004; pp. 241-267; vol. 11, No. 3; ACM Transactions on Computer-Human Interaction; Broadway, New York.

Gabriel, et al.; "Conscientious Software"; Oct. 2006; pp. 433-450; ACM 1-59593-348-04/06/0010; Sun Microsystems, Inc.; Portland, Oregon.

McTear; "Spoken Dialogue Technology: Enabling the Conversational User Interface"; Mar. 2002; pp. 90-169; vol. 34, No. 1; ACM Computing Surveys.

Jagadish, et al.; "Making Database Systems Usable"; SIGMOD'07; Jun. 12-14, 2007;pp. 13-24; ACM 978-1-59593-686-8/07/0006; Beijing, China.

Marshall, et al.; Exploring the Relationship Between Personal and Public Annotation; JCDL'04; Jun. 7-11, 2004; pp. 3349-357; ACM 1-58113-832-6/04/0005; Tucson, Arizona.

Athanasopoulos, et al.; Enhanced CAPTCHAs: Using Animation to Tell Humans and Computers Apart; 2006; pp. 97-108; CMS 2006-LNCS 4237; IFIP.

Office Action, U.S. Appl. No. 11/869,313, Aug. 5, 2010.
Office Action, U.S. Appl. No. 11/868,766, Aug. 6, 2010.
Office Action, U.S. Appl. No. 11/868,513, Aug. 6, 2010.

Fetzer, C., Kaefer, K., Augsten, T., Meusel, R., Kanitz, D., Stoff, T., Becker, T., Holt, C. and Baudisch, P. Multitoe: High-Precision Interation with Back-Projected Floors Based on High-Resolution Multi-Touch Input to appear in Proceedings of UIST 2010, New York, NY, Oct. 3-6, 2010, 10 pages.

Final Office Action, U.S. Appl. No. 11/869,313, Dec. 10, 2010.
Office Action, U.S. Appl. No. 11/868,513, Dec. 10, 2010.
Office Action, U.S. Appl. No. 11/869,987, Nov. 30, 2010.
Final Office Action, U.S. Appl. No. 11/868,766, Dec. 9, 2010.
Office Action, U.S. Appl. No. 11/868,474, Oct. 29, 2010.

Bollacker, et al.; "A System for Automatic Personalized Tracking of Scientific Literature on the Web", Proceedings of the Fourth ACM Conference on Digital Libraries, Aug. 11-14, 1999, pp. 105-113, ACM Press, New York.

Office Action, U.S. Appl. No. 11/869,313, Jan. 28, 2011.

Athanasopoulos, Elias; Antonatos, Spiros, "Enhanced CAPTCHAs: Using Animation to tell Humans and Computers Apart", IFIP 2006, pp. 97-108 (copy not furnished, already present in application).

Izadi et al. (Dynamo: A public interactive surface supporting cooperative sharing and exchange of media; pp. 1-9; copyright 2003).

Office Action, U.S. Appl. No. 11/868,216, Aug. 20, 2010.
Office Action, U.S. Appl. No. 11/950,872, Oct. 15, 2010.
Final Office Action for U.S. Appl. No. 11/868,216, mailed Mar. 3, 2011, 21 pages.
Final Office Action for U.S. Appl. No. 11/869,313, mailed May 24, 2011, 21 pages.

(56) References Cited

OTHER PUBLICATIONS

Gronbaek et al., "iGameFloor—A Platform for Co-Located Collaborative Games," ACE'07, Jun. 13-15, 2007.
Final Office Action for U.S. Appl. No. 11/868,513, mailed Apr. 15, 2011, 16 pages.
Notice of Allowance for U.S. Appl. No. 11/869,987, mailed May 16, 2011, 11 pages.
Office Action for U.S. Appl. No. 11/868,766, mailed Apr. 14, 2011, 19 pages.
Office Action for U.S. Appl. No. 11/868,216, mailed Aug. 3, 2011, 14 pages.
Final Office Action for U.S. Appl. No. 11/868,766, mailed Aug. 4, 2011, 19 pages.
Office action for U.S. Appl. No. 11/868,513, mailed Jul. 28, 2011, 14 pages.
Final Office Action for U.S. Appl. No. 11/868,216 (Do et al., "Displaying Personalized Documents to Users of a Surface Computer," filed Oct. 5, 2007), US Patent and Trademark Office, mailed Jan. 20, 2012, 13 pages.

* cited by examiner

DISPLAYING DOCUMENTS TO A PLURALITY OF USERS OF A SURFACE COMPUTER

BACKGROUND OF THE INVENTION

1. Field of the Invention

The field of the invention is data processing, or, more specifically, methods, apparatus, and products for displaying documents to a plurality of users of a surface computer.

2. Description of Related Art

Multi-touch surface computing is an area of computing that has made tremendous advancements over the last few years. Multi-touch surface computing allows a user to interact with a computer through a surface that is typically implemented as a table top. The computer renders a graphical user interface ('GUI') on the surface and users may manipulate GUI objects directly with their hands using multi-touch technology as opposed to using traditional input devices such as a mouse or a keyboard. In such a manner, the devices through which users provide input and receive output are merged into a single surface, which provide an intuitive and efficient mechanism for users to interact with the computer. As surface computing becomes more ubiquitous in everyday environments, readers will appreciate advancements in how users may utilize surface computing to intuitively and efficiently perform tasks that may be cumbersome using traditional input devices such as a keyboard and mouse. Specifically, readers will appreciate advancements in displaying documents to a plurality of users of a surface computer.

SUMMARY OF THE INVENTION

Methods, apparatus, and products are disclosed for displaying documents to a plurality of users of a surface computer, the surface computer comprising a surface, surface computer capable of receiving multi-touch input through the surface and rendering display output on the surface, that include: registering a plurality of users with the surface computer, the plurality of users including a moderator and a plurality of participants; assigning, to each registered user, a portion of the surface for interaction between that registered user and the surface computer; selecting, by the moderator for sharing with the plurality of participants, a document stored in the surface computer; rendering contents of the document on the moderator's assigned portion of the surface; and rendering the contents of the document on each of the participants' portions of the surface.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
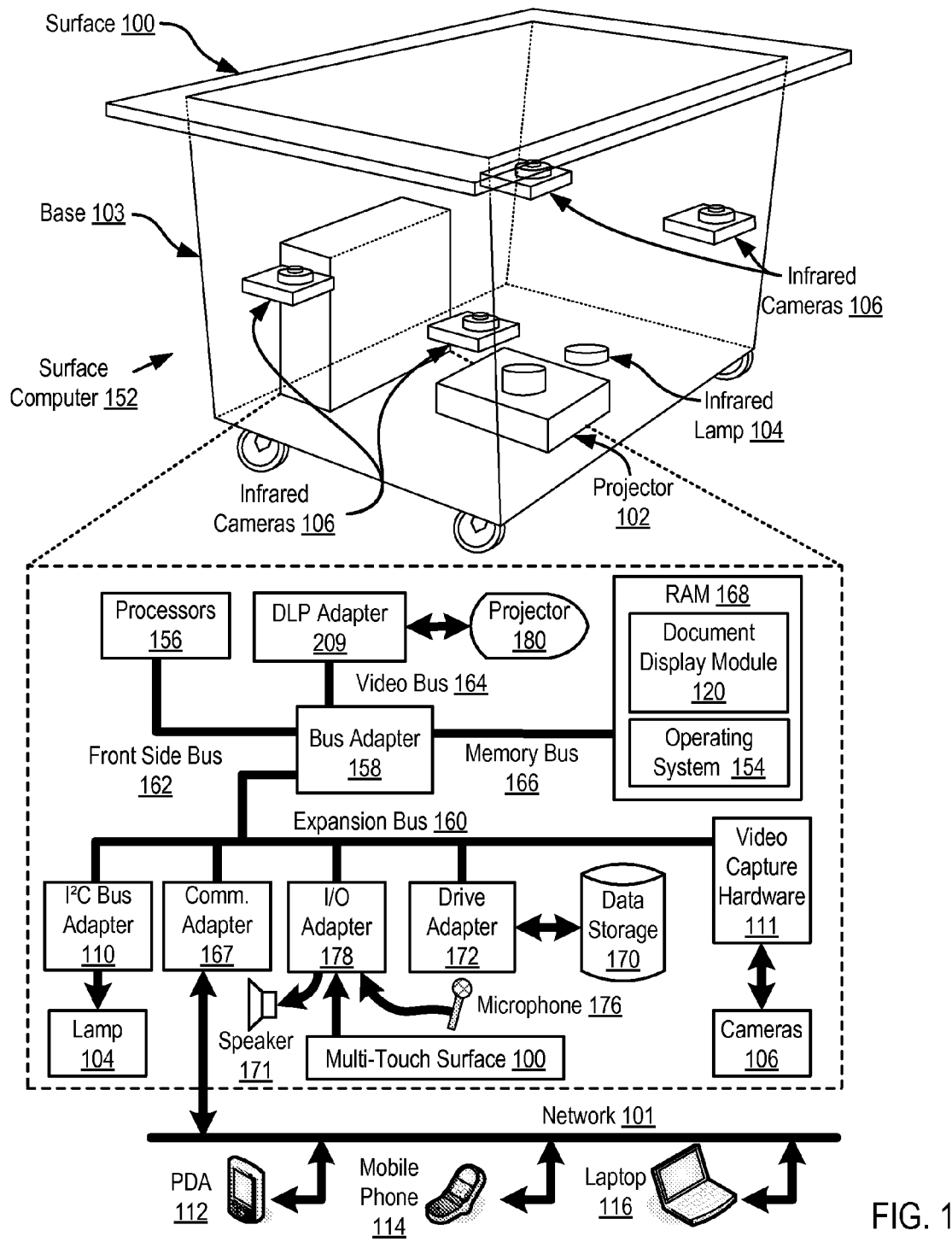
FIG. 1 sets forth a functional block diagram of an exemplary surface computer capable of displaying documents to a plurality of users according to embodiments of the present invention.

Exemplary methods, apparatus, and products for displaying documents to a plurality of users of a surface computer in accordance with the present invention are described with reference to the accompanying drawings, beginning with FIG. 1. FIG. 1 sets forth a functional block diagram of an exemplary surface computer (152) capable of displaying documents to a plurality of users according to embodiments of the present invention. The exemplary surface computer (152) of FIG. 1 includes a surface (100) mounted atop a base (103) that houses the other components of the surface computer (152). The surface (100) may be implemented using acrylic, glass, or other materials as will occur to those of skill in the art. In addition to the computing functionality provided by the surface computer (152), the surface (100) of FIG. 1 may also serve as a table top for a coffee table, dining table, a conference table, or some other table as will occur those of skill in the art. Examples of a surface computer that may be improved for displaying documents to a plurality of users according to embodiments of the present invention may include the Microsoft Surface™ and the ROSIE Coffee Table by Savant.

The exemplary surface computer (152) of FIG. 1 is capable of receiving multi-touch input through the surface (100) and rendering display output on the surface (100). Multi-touch input refers to the ability of the surface computer (152) to recognize multiple simultaneous points of contact between objects and the surface (100). These objects may include hands, fingers, portable electronic devices, papers, cups, plates, or any other object as will occur to those of skill in the art. Such recognition may include the position and pressure or degree of each point of contact, which allows gestures and interaction with multiple fingers or hands through intuitive gestures. Depending largely on the size of the surface, a surface computer typically supports interaction with more than one user or object simultaneously. In the example of FIG. 1, the surface computer (100) supports interaction with a plurality of users.

In the example of FIG. 1, the exemplary surface computer (152) receives multi-touch input through the surface (100) by reflecting infrared light off of objects on top of the surface (100) and capturing the reflected images of the objects using multiple infrared cameras (106) mounted inside the base (103). Using the reflected infrared images, the surface computer (100) may then perform pattern matching to determine the type of objects that the images represent. The objects may include fingers, hands, portable electronic devices, papers, and so on. The infrared light used to generate the images of the objects is provided by an infrared lamp (104) mounted to the base (103) of the surface computer (152). Readers will note that infrared light may be used to prevent any interference with users' ability to view the surface (100) because infrared light is typically not visible to the human eye.

Although the exemplary surface computer (152) of FIG. 1 above receives multi-touch input through the surface (100) using a system of infrared lamps and cameras, readers will note that such implementation are for explanation only and not for limitation. In fact, other embodiments of a surface computer for displaying documents to a plurality of users according to embodiments of the present invention may use other technologies as will occur to those of skill in the art such as, for example, frustrated total internal reflection. Frustrated total internal reflection refers to a technology that disperses light through a surface using internal reflection. When an object comes in contact with one side of the surface, the dispersed light inside the surface scatters onto light detectors on the opposite side of the surface, thereby identifying the point at which the object touched the surface. Other technologies may include dispersive signal technology and acoustic pulse recognition.

In the example of FIG. 1, the surface computer (152) renders display output on the surface (100) using a projector (102). The projector (102) renders a GUI on the surface (100) for viewing by the users. The projector (102) of FIG. 1 is implemented using Digital Light Processing ('DLP') technology originally developed at Texas Instruments. Other technologies useful in implementing the projector (102) may include liquid crystal display ('LCD') technology and liquid crystal on silicon ('LCOS') technology. Although the exemplary surface computer (152) of FIG. 1 above displays output on the surface (100) using a projector (102), readers will note that such an implementation is for explanation and not for limitation. In fact, other embodiments of a surface computer for displaying documents to a plurality of users according to embodiments of the present invention may use other technologies as will occur to those of skill in the art such as, for example, embedding a flat panel display into the surface (100).

The surface computer (152) of FIG. 1 includes one or more computer processors (156) as well as random access memory ('RAM') (168). The processors (156) are connected to other components of the system through a front side bus (162) and bus adapter (158). The processors (156) are connected to RAM (168) through a high-speed memory bus (166) and to expansion components through an extension bus (168).

Stored in RAM (156) is a document display module (120), software that includes computer program instructions for displaying documents to a plurality of users of the surface computer (152) according to embodiments of the present invention. The document display module (120) operates generally for displaying documents to a plurality of users of the surface computer (152) according to embodiments of the present invention by: registering a plurality of users with the surface computer (152), the plurality of users including a moderator and a plurality of participants; assigning, to each registered user, a portion of the surface (100) for interaction between that registered user and the surface computer (152); selecting, by the moderator for sharing with the plurality of participants, a document stored in the surface computer (152); rendering contents of the document on the moderator's assigned portion of the surface (100); and rendering the contents of the document on each of the participants' portions of the surface (100). Readers will note that in a preferred embodiment, the display surface (100) is sufficiently large to accommodate several individuals seated around the display surface such as, for example, when the surface computer serves as a conference table. The document rendered on the surface (100) may include a word processing document, an image, a video, slide show presentation, XML-based document, and so on. The moderator is a user of the surface computer (152) who shares the document with other users of the surface computer (152). The moderator may control the contents of the document that each user views in that user's portion of the surface (100). The participants are the other users of the surface computer (152) with whom the moderator shares the document.

The document display module (120) of FIG. 1 may also operate generally for displaying documents to a plurality of users of the surface computer (152) according to embodiments of the present invention by: receiving, by the surface computer from the moderator, an instruction to terminate sharing of the document and removing, from each of the participants' portions of the surface in response to receiving the instruction, the rendered contents of the document.

Also stored in RAM (168) is an operating system (154). Operating systems useful for applying displaying documents to a plurality of users of a surface computer according to embodiments of the present invention may include or be derived from UNIX™, Linux™, Microsoft Vista™, Microsoft XP™, AIX™, IBM's i5/OS™, and others as will occur to those of skill in the art. The operating system (154) and the document display module (120) in the example of FIG. 1 are shown in RAM (168), but many components of such software typically are stored in non-volatile memory also, such as, for example, on a disk drive (170).

The surface computer (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computing devices for displaying documents to a plurality of users of a surface computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory), RAM drives, and so on, as will occur to those of skill in the art.

The example surface computer (152) of FIG. 1 includes one or more input/output ('I/O') adapters (178). I/O adapters implement user-oriented input/output through, for example, software drivers and computer hardware for controlling output to devices such as computer display screens or speakers (171), as well as user input from user input devices such as, for example, microphone (176) for collecting speech input. The example surface computer (152) of FIG. 1 also includes a Digital Light Processing adapter (209), which is an example of an I/O adapter specially designed for graphic output to a projector (180). Video adapter (209) is connected to processor (156) through a high speed video bus (164), bus adapter (158), and the front side bus (162), which is also a high speed bus.

The exemplary surface computer (152) of FIG. 1 includes video capture hardware (111) that converts image signals received from the infrared cameras (106) to digital video for further processing, including pattern recognition. The video capture hardware (111) of FIG. 1 may use any number of video codec, including for example codec described in the Moving Picture Experts Group ('MPEG') family of specifications, the H.264 standard, the Society of Motion Picture and Television Engineers' 421M standard, or any other video codec as will occur to those of skill in the art. Although the video capture hardware (111) of FIG. 1 is depicted separately from the infrared cameras (106), readers will note that in some embodiment the video capture hardware (111) may be incorporated into the cameras (106). In such embodiments, the infrared camera (106) may connect to the other components of the surface computer through a Universal Serial Bus ('USB') connection, FireWire connection, or any other data communications connection as will occur to those of skill in the art.

The exemplary surface computer (152) of FIG. 1 also includes an Inter-Integrated Circuit ('I²C') bus adapter (110). The I²C bus protocol is a serial computer bus protocol for connecting electronic components inside a computer that was first published in 1982 by Philips. I²C is a simple, low-bandwidth, short-distance protocol. Through the I²C bus adapter (110), the processors (156) control the infrared lamp (104). Although the exemplary surface computer (152) utilizes the I²C protocol, readers will note this is for explanation and not for limitation. The bus adapter (110) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

The exemplary surface computer (152) of FIG. 1 also includes a communications adapter (167) that couples the surface computer (152) for data communications with other computing devices through a data communications network (101). Such a data communication network (100) may be implemented with external buses such as a Universal Serial Bus ('USB'), or as an Internet Protocol ('IP') network or an Ethernet™ network, for example, and in other ways as will occur to those of skill in the art. Communications adapters implement the hardware level of data communications through which one computer sends data communications to another computer, directly or through a data communications network. Examples of communications adapters useful for displaying documents to a plurality of users of a surface computer according to embodiments of the present invention include modems for wired dial-up communications, Ethernet (IEEE 802.3) adapters for wired data communications network communications and 802.11 adapters for wireless data communications network communications.

FIG. 1 illustrates several computing devices (112, 114, 116) connected to the surface computer (152) for data communications through a network (101). Data communication may be established when the Personal Digital Assistant (112), the mobile phone (114), and the laptop (116) a placed on top of the surface (100). Through the images of the computing devices (112, 114, 116), the surface computer (152) may identify each device (112, 114, 116) and configure a wireless data communications connections with each device. The contents of any documents contained in the devices (112, 114, 116) may be retrieved into the surface computer's memory and rendered on the surface (100) for interaction with surface computer's users.

The arrangement of networks and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Figure 2A:
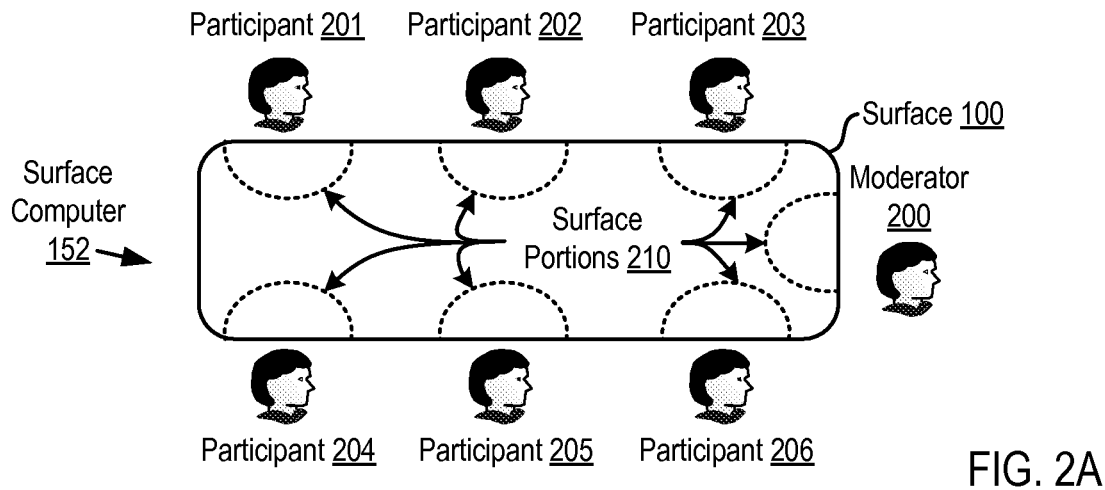
FIG. 2A sets forth a line drawing illustrating an exemplary surface useful in displaying documents to a plurality of users of a surface computer according to embodiments of the present invention.
Figure 2B:
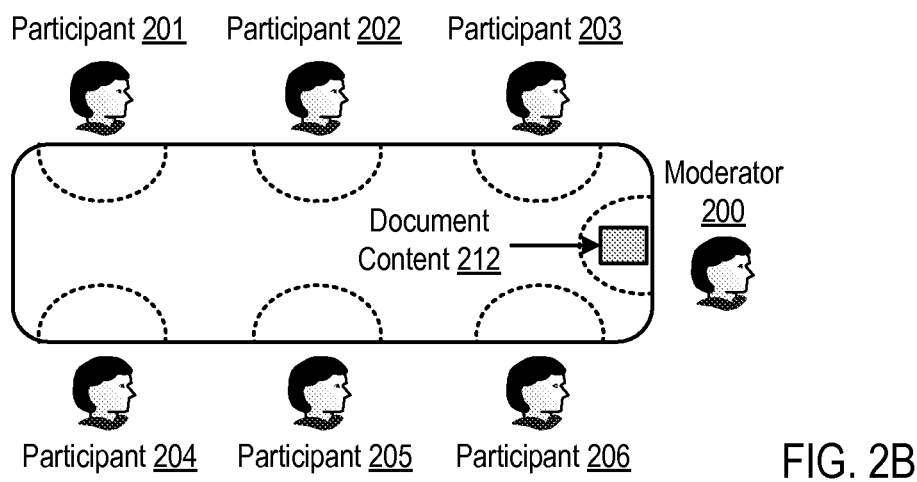
FIG. 2B sets forth a line drawing illustrating a further exemplary surface useful in displaying documents to a plurality of users of a surface computer according to embodiments of the present invention.
Figure 2C:
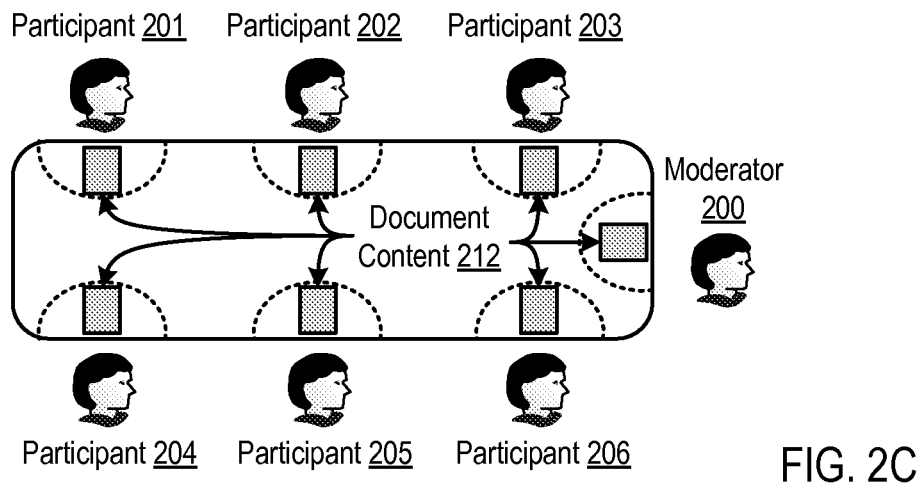
FIG. 2C sets forth a line drawing illustrating a further exemplary surface useful in displaying documents to a plurality of users of a surface computer according to embodiments of the present invention.

For further explanation, FIGS. 2A-C sets forth line drawings illustrating exemplary surfaces useful in displaying documents to a plurality of users of a surface computer according to embodiments of the present invention. The surface (100) of FIGS. 2A-C is comprised in a surface computer (152). The surface computer is capable of receiving multi-touch input through the surface (100) and rendering display output on the surface (100).

In the examples of FIGS. 2A-C, a plurality of users (200-206) are positioned adjacent to the surface computer (152) for interaction through the surface (100). The users include a moderator (200) and a plurality of participants (201-206). Each user (200-206) may choose their respective position around the surface computer (152) by choosing a chair in which to sit around the surface computer (152) or by merely standing near an edge of the surface (100). After the users (200-206) choose a location near the surface (100), the surface computer (152) registers the users (200-206) with the surface computer (152) and assigns a portion (210) of the surface (100) to each registered user (200-206) for interaction between that registered user (200-206) and the surface computer (152). Registering the users (200-206) with the surface computer (152) and assigning a portion (210) of the surface (100) to each registered user (200-206) is discussed in more detail below.

In FIG. 2B, the moderator (200) selects a document stored in the surface computer (152) for sharing with the plurality of participants (201-206). The document may initially be stored in a portable computing device placed on the surface (100) of the surface computer (152). Upon detecting that the computing device is placed on the surface (100) of the surface computer (152), the surface computer (152) may establish a data communications connection with the portable computing device and retrieve the document from the computing device. Upon receiving the selection from the moderator (200), the surface computer (152) renders the contents (212) of the document on the moderator's assigned portion (210) of the surface (100).

In addition to rendering the document contents (212) on the moderator's assigned portion (210) of the surface (100), FIG. 2C illustrates that the surface computer (152) also renders the contents (212) of the document on each of the participants' portions (210) of the surface (100). In the example of FIG. 2C, the surface computer (152) may concurrently render the same portion of the contents (212) on each of the participants' portions of the surface (100) as the portion of the contents rendered on the moderator's portion of the surface (100). That is, the moderator (200) controls the portion of the document contents (212) viewed by each of the participants (201-206). In other embodiments, however, the surface computer (152) may allow each participant to independently navigate the contents (212) of the document rendered on that participant's portion (210) of the surface (100). Still further, some of the participants (201-206) may have authorization to modify the contents (212) of the document.

After the moderator (200) is finished sharing the document with the participants (201-206), the moderator may instruct the surface computer (152) to stop sharing the document. The surface computer (152) of FIG. 2C therefore may receive an instruction from the moderator (200) to terminate sharing of the document. In response to receiving the moderator's instruction to terminate sharing of the document, the surface computer (152) may remove the rendered contents (212) of the document from each of the participants' portions of the surface (100).

Figure 3:
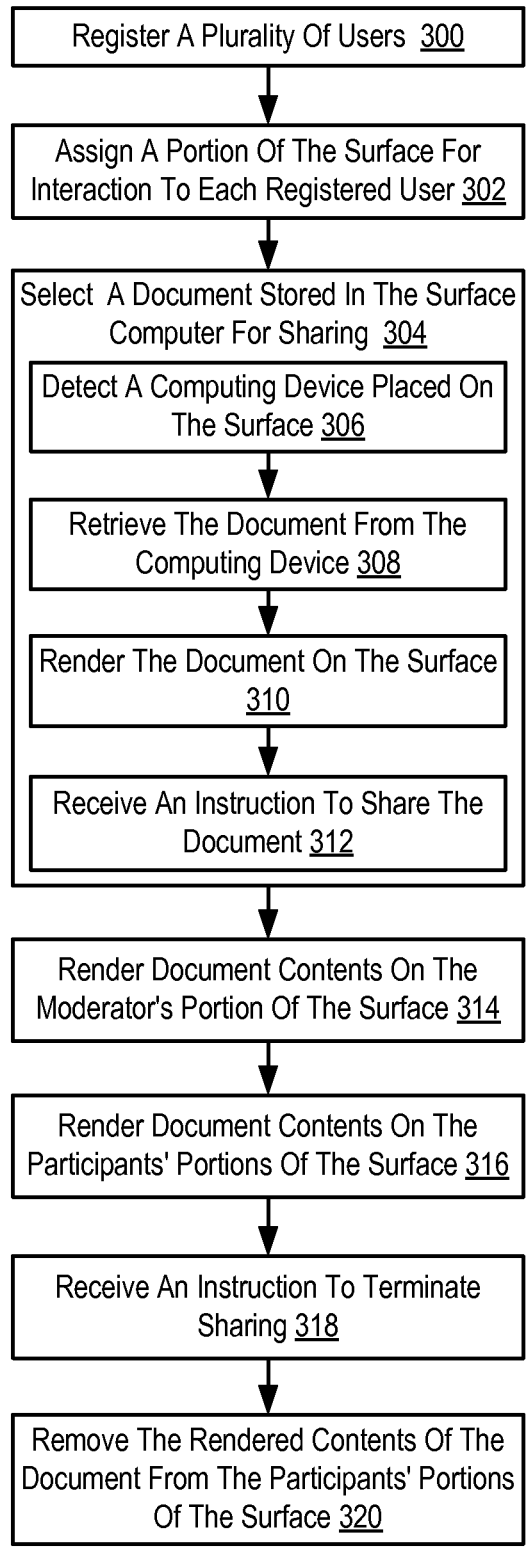
FIG. 3 sets forth a flow chart illustrating an exemplary method of displaying documents to a plurality of users of a surface computer according to embodiments of the present invention.

For further explanation, FIG. 3 sets forth a flow chart illustrating an exemplary method of displaying documents to a plurality of users of a surface computer according to embodiments of the present invention. The surface computer includes a surface and is capable of receiving multi-touch input through the surface and rendering display output on the surface. In such a manner, the surface provides an intuitive and efficient mechanism for users to interact with the surface computer.

The method of FIG. 3 includes registering (300) a plurality of users with the surface computer. The plurality of users includes a moderator and a plurality of participants. The moderator is a user of the surface computer who shares a document with other users of the surface computer referred to as the participants. Registering (300) a plurality of users with the surface computer according to the method of FIG. 3 may be carried out by authenticating the identity of a user and determining the user's authorization for using the surface computer. The authentication process may be carried out in variety of ways as will occur to those of skill in the art. For example, the surface computer may render a list of authorized users on the surface to allow the requesting user to select their name from the list. Upon selecting their name, the user may provide a password or other security tokens used for authentication. Consider another example, in which the users are all part of the same team in a company and are using the surface computer to conduct a team meeting. In such an example, the authentication process may be carried out by placing the user's company RFID badge on the surface so that the surface computer may identify the user by comparing security data retrieved from the user's company RFID badge with security data for the user stored in the company's employee database. Still further, other examples of authenticating a user may include the use of biometric authentication such as, for example, voice prints, retinal scans, or fingerprint matching, or the use of public-private key infrastructures.

After authenticating the user, the surface computer may determine the user's authorization for using the surface computer by retrieving access permissions for the authenticated user from the surface computer's authorization policy. The granularity of the access permissions may vary from one embodiment to another. For example, an authorization policy may provide either complete access to the surface computer or no access to the surface computer at all depending on the user's identity. In other embodiments, an authorization policy may provide access to view documents using the surface computer, but no authorization to add, modify, or delete documents. Readers will note that the authorization policy may not assign access permission directly to individual users. Rather, the authorization policy may assign access permissions to a group to which an individual user belongs.

The method of FIG. 3 also includes assigning (302), to each registered user, a portion of the surface for interaction between that registered user and the surface computer. Assigning (302), to each registered user, a portion of the surface for interaction between that registered user and the surface computer according to the method of FIG. 3 may be carried out by identifying a point on the surface that is adjacent to that registered user and defining a region around that identified point for use by that registered user to interact with the surface computer. The surface computer may identify a point on the surface that is adjacent to a registered user by instructing a user to touch the surface directly in front of that user and detecting the location of the user's touch though any number of multi-touch detection technologies such as, for example, surface image processing or frustrated total internal reflection. Other techniques for identifying a point on the surface that is adjacent to a registered user may include inferring a point on the surface that is adjacent to a registered user by triangulation using a set of microphones that capture the user's speech or proximity sensors.

The surface computer may define a region around that identified point by establishing a boundary around the identified point that extends from the edge of the surface toward the center of the surface. Combined with the edge of the surface, the boundary may resemble a rectangle, a semicircle, a triangle, or any other geometric shape. In some embodiments, the surface computer may render a line along the boundary of the region to aid the users in visualizing their portions of the surface through which they may interact with the surface computer. The boundary used to define the region may be fixed or movable by the user. The user may move the boundary by manipulating line rendered on the surface using the user's fingers. For example, if the user wants a larger portion of the surface with which to interact with the surface computer, then the user may drag the boundary line defining the user's portion of the surface away from the user. The surface computer may detect the user's input, recognize the input as an adjustment to the user's boundary, reassign the surface portion to the user based on the boundary adjustment input, and redraw the boundary line at the edge of the user's assigned portion of the surface.

Readers will note that assigning (302), to each registered user, a portion of the surface for interaction between that registered user and the surface computer as described above is carried out using input from the users of the surface computer. In some other embodiments, however, assigning (302), to each registered user, a portion of the surface for interaction between that registered user and the surface computer may be carried out without any user intervention at all. The surface computer may assign a portion of the surface to each user based on user preferences provided in the user's profile such as, for example, the user's preferred location around the surface. In other embodiments, a moderator may provide the surface computer with assignment instructions for each of the users around the surface. Readers will note that the surface computer may adjust the size of each user's assigned portion based on the surface size, the number of users sitting around the surface, and so on.

The method of FIG. 3 includes selecting (304), by the moderator for sharing with the plurality of participants, a document stored in the surface computer. As mentioned above, the document rendered on the surface may include a word processing document, an image, a video, slide show presentation, XML-based document, and so on. In some embodiments, the document may initially be stored on a portable computing device. Selecting (304), by the moderator for sharing with the plurality of participants, a document stored in the surface computer according to the method of FIG. 3 therefore includes detecting (306), by the surface computer, a computing device placed on the surface of the surface computer, whereby the computing device has stored upon it the document for sharing. The surface computer may detect (306) a computing device placed on the surface of the surface computer according to the method of FIG. 3 using any number of multi-touch detection technologies such as, for example, surface image processing or frustrated total internal reflection.

Using surface image processing to identify the computing device, for example, the surface computer analyzes an image of the surface to identify the computing device using pattern recognition software. After recognizing the computing device, the surface computer may retrieve connection information from a device data repository used to establish data communications with the computing device placed on the surface. To aid identification of the portable computing device, a small infrared tag may be affixed to the device that provides the surface computer with a device identifier for the device.

Using frustrated total internal reflection technology to identify the computer device, for example, the surface computer is able to detect that a device is placed on the surface. Upon detecting that the device is place on the surface of the surface computer, the surface computer may interrogate the device to retrieve data communication connection information. In some embodiments, the portable computing device may have affixed to it an RFID tag that the surface computer may use to retrieve a device identifier for the device, which in turn may be used by the surface computer to retrieve data communication connection information from a device data repository.

Selecting (304), by the moderator for sharing with the plurality of participants, a document stored in the surface computer according to the method of FIG. 3 includes retrieving (308), by the surface computer, the document from the computing device. The surface computer may retrieve (308) the document from the computing device according to the method of FIG. 3 by establishing a data communications connection with the device and copying the document to the surface computer's internal computer memory. Such a data communications connection may implemented, for example, according to the IEEE 802.11 family of specifications, the Bluetooth family of specifications, the family of specification promulgated by the Infrared Data Association. In copying the document to the surface computer's internal computer memory, the surface computer may retrieve copies of all or a portion of all of the documents stored on the portable computing device.

Selecting (304), by the moderator for sharing with the plurality of participants, a document stored in the surface computer according to the method of FIG. 3 includes rendering (310), by the surface computer, the document on the surface. The surface computer may render (310) the document on the surface according to the method of FIG. 3 by displaying the titles of all of the documents that the surface computer retrieved from the portable computing device on the moderator's portion of the surface. In such a manner, the surface computer may render the document on the surface without rendering the contents of the document on the surface. In other embodiments, the surface computer may render (310) the document on the surface according to the method of FIG. 3 by displaying thumbnails of the retrieved documents for viewing by the moderator on the moderator's assigned portion of the surface.

Selecting (304), by the moderator for sharing with the plurality of participants, a document stored in the surface computer according to the method of FIG. 3 also includes receiving (312), by the surface computer from the moderator, an instruction to share the document with the participants. The surface computer may receive (312) an instruction from the moderator to share the document with the participants according to the method of FIG. 3 by detecting a particular hand gesture on the moderator's portion of the surface that the moderator uses to specify that the document is to be shared. In other embodiments, the surface computer may receive (312) an instruction from the moderator to share the document with the participants according to the method of FIG. 3 by receiving a voice command from the moderator to share the particular document.

After the moderator selects (304) a document for sharing with the participants, the method of FIG. 3 includes rendering (314) contents of the document on the moderator's assigned portion of the surface. Rendering (314) contents of the document on the moderator's assigned portion of the surface according to the method of FIG. 3 may be carried out by opening the document, orienting the display contents such that the top of the contents is toward the center of the surface, and displaying at least a portion of the contents of the document on the moderator's assigned portion of the surface. For example, if the document is a video, the surface computer may open the video document and begin displaying the frames for the video on the moderator's portion of the surface. If the document is a word processing file, the surface computer may open the document and display the first page on the moderator's portion of the surface. If the document is a slide show presentation, the surface computer may open the document and display the first slide on the moderator's portion of the surface.

The method of FIG. 3 also includes rendering (316) the contents of the document on each of the participants' portions of the surface. Rendering (316) the contents of the document on each of the participants' portions of the surface according to the method of FIG. 3 may be carried out by orienting the display contents such that the top of the contents is toward the center of the surface for each participant and displaying at least a portion of the contents of the document on each participant's assigned portions of the surface. Rendering (316) the contents of the document on each of the participants' portions of the surface according to the method of FIG. 3 may be carried out by concurrently rendering the same portion of the contents on each of the participants' portions of the surface as the portion of the contents rendered on the moderator's portion of the surface. In such an embodiment, the moderator controls the portion of the document contents viewed by each of the participants because the participants only have access to the portion of the contents displayed on the moderator's portion of the surface. Rather than deny the participants the ability to view the document contents on their own, rendering (316) the contents of the document on each of the participants' portions of the surface according to the method of FIG. 3 may also be carried out by allowing each participant to independently navigate the contents of the document rendered on that participant's portion of the surface. In addition, some of the user's may have authorization to modify the contents of the document and store the modified version of the documents on a portable computing device to take with them when the leave the surface computer. Authorizing users to modify the contents of the document may allow the users to take notes directly in the document or supplement the document with additional user-specific information.

After the moderator is finished sharing the document with the participants, the method of FIG. 3 includes receiving (318), by the surface computer from the moderator, an instruction to terminate sharing of the document. The surface computer may receive (318) an instruction from the moderator to terminate sharing of the document according to the method of FIG. 3 by detecting a particular hand gesture on the moderator's portion of the surface that the moderator uses to specify that document sharing is to be terminated. In other embodiments, the surface computer may receive (318) an instruction from the moderator to terminate sharing of the document according to the method of FIG. 3 by receiving a voice command from the moderator to terminate the document sharing.

The method of FIG. 3 includes removing (320), from each of the participants' portions of the surface in response to receiving the instruction, the rendered contents of the document. Removing (320), from each of the participants' portions of the surface in response to receiving the instruction, the rendered contents of the document according to the method of FIG. 3 may be carried out by deleting the rendered contents of the document from each of the participants' portions of the surface without removing the other contents that may be displayed in each of the participants' portions of the surface.

Readers will note that displaying documents to a plurality of users of a surface computer according to embodiments of the present invention as described above advantageously provides a common interface for viewing and manipulating a document among a group of users. Providing a common interface for interacting with personalized documents has performance advantages over traditional systems that employ multiple network-connected devices because network overhead is substantially reduced and real-time collaborative usability is enhanced.

Exemplary embodiments of the present invention are described largely in the context of a fully functional computer system for displaying documents to a plurality of users of a surface computer. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of displaying documents to a plurality of users of a surface computer, the surface computer comprising a surface, the surface computer capable of receiving multi-touch input through the surface and rendering display output on the surface, the method comprising:

registering a plurality of users with the surface computer, the plurality of users including a moderator and a plurality of participants;

assigning, to each registered user, a portion of the surface for interaction between that registered user and the surface computer;

selecting, by the moderator for sharing with the plurality of participants, a document stored in the surface computer;

receiving, by the surface computer from the moderator, an instruction to share the document with the participants;

in response to receiving the instruction to share, rendering a portion of the contents of the document on the moderator's assigned portion of the surface, wherein the portion of the contents of the document is less than the entire document; and in further response to receiving the instruction to share, rendering a shared portion of the contents of the document on each of the participants' portions of the surface, wherein rendering the shared portion of the contents of the document on each of the participants' assigned portions of the surface further comprises concurrently rendering the same shared portion of the contents on each of the participants' assigned portions of the surface as the portion of the contents rendered on the moderator's portion of the surface, wherein the moderator has access to the entire document and each participant can only view the shared portion of the contents of the document rendered on the participants' assigned portions of the surface.

2. The method of claim 1 wherein at least one of the users has authorization to modify the contents of the document.

3. A surface computer for displaying documents to a plurality of users of a surface computer, the surface computer comprising a surface, the surface computer capable of receiving multi-touch input through the surface and rendering display output on the surface, the surface computer comprising a computer processor, a computer memory operatively coupled to the computer processor, the computer memory having disposed within it computer program instructions capable of:

registering a plurality of users with the surface computer, the plurality of users including a moderator and a plurality of participants;

assigning, to each registered user, a portion of the surface for interaction between that registered user and the surface computer;

selecting, by the moderator for sharing with the plurality of participants, a document stored in the surface computer;

receiving, by the surface computer from the moderator, an instruction to share the document with the participants;

in response to receiving the instruction to share, rendering a portion of the contents of the document on the moderator's assigned portion of the surface, wherein the portion of the contents of the document is less than the entire document; and in further response to receiving the instruction to share, rendering a shared portion of the contents of the document on each of the participants' portions of the surface, wherein rendering the shared portion of the contents of the document on each of the participants' assigned portions of the surface further comprises concurrently rendering the same shared portion of the contents on each of the participants' assigned portions of the surface as the portion of the contents rendered on the moderator's portion of the surface, wherein the moderator has access to the entire document and each participant can only view the shared portion of the contents of the document rendered on the participants' assigned portions of the surface.

4. The surface computer of claim 3 wherein at least one of the users has authorization to modify the contents of the document.

5. A computer program product for displaying documents to a plurality of users of a surface computer, the surface computer comprising a surface, the surface computer capable of receiving multi-touch input through the surface and rendering display output on the surface, the computer program product disposed in a non-transitory computer readable medium, the computer program product comprising computer program instructions capable of:
registering a plurality of users with the surface computer, the plurality of users including a moderator and a plurality of participants;
assigning, to each registered user, a portion of the surface for interaction between that registered user and the surface computer;
selecting, by the moderator for sharing with the plurality of participants, a document stored in the surface computer;
receiving, by the surface computer from the moderator, an instruction to share the document with the participants;
in response to receiving the instruction to share, rendering a portion of the contents of the document on the moderator's assigned portion of the surface, wherein the portion of the contents of the document is less than the entire document; and
in further response to receiving the instruction to share, rendering a shared portion of the contents of the document on each of the participants' portions of the surface, wherein rendering the shared portion of the contents of the document on each of the participants' assigned portions of the surface further comprises concurrently rendering the same shared portion of the contents on each of the participants' assigned portions of the surface as the portion of the contents rendered on the moderator's portion of the surface, wherein the moderator has access to the entire document and each participant can only view the shared portion of the contents of the document rendered on the participants' assigned portions of the surface.

6. The computer program product of claim 5 wherein at least one of the users has authorization to modify the contents of the document.

7. The computer program product of claim 5 wherein the computer readable medium comprises a recordable medium.

8. The method of claim 1 wherein selecting, by the moderator for sharing with the plurality of participants, a document stored in the surface computer further comprises:
detecting, by the surface computer, a computing device placed on the surface of the surface computer, the computing device having stored upon it the document; and
retrieving, by the surface computer, the document from the computing device.

9. The surface computer of claim 3 wherein selecting, by the moderator for sharing with the plurality of participants, a document stored in the surface computer further comprises:
detecting, by the surface computer, a computing device placed on the surface of the surface computer, the computing device having stored upon it the document; and
retrieving, by the surface computer, the document from the computing device.

10. The computer program product of claim 5 wherein selecting, by the moderator for sharing with the plurality of participants, a document stored in the surface computer further comprises:
detecting, by the surface computer, a computing device placed on the surface of the surface computer, the computing device having stored upon it the document; and
retrieving, by the surface computer, the document from the computing device.

11. The method of claim 1 further comprising:
receiving, by the surface computer from the moderator, an instruction to terminate sharing the document; and
in response to receiving the instruction to terminate sharing, removing by the surface computer, the shared portion of the contents of the document from each of the participants' portions of the surface.

12. The method of claim 1 wherein assigning, to each registered user, a portion of the surface for interaction between that registered user and the surface computer further comprises the surface computer performing the following for each registered user:
identifying a point on the surface adjacent to the registered user; and
defining a region around the identified point for use by the registered user to interact with the surface computer.

13. The method of claim 1 wherein rendering the shared portion of the contents of the document on each of the participants' portions of the surface further comprises the surface computer orienting the shared portion of the contents of the document such that a top of the shared portion of the contents of the document is toward a center of the surface.

14. The surface computer of claim 3, further comprising the computer memory having disposed within it computer program instructions capable of:
receiving, by the surface computer from the moderator, an instruction to terminate sharing the document; and
in response to receiving the instruction to terminate sharing, removing by the surface computer, the shared portion of the contents of the document from each of the participants' portions of the surface.

15. The surface computer of claim 3 wherein assigning, to each registered user, a portion of the surface for interaction between that registered user and the surface computer further comprises the computer memory having disposed within it computer program instructions capable of:
identifying a point on the surface adjacent to the registered user; and
defining a region around the identified point for use by the registered user to interact with the surface computer.

16. The surface computer of claim 3 wherein rendering the shared portion of the contents of the document on each of the participants' portions of the surface further comprises the computer memory having disposed within it computer program instructions capable of orienting the shared portion of the contents of the document such that a top of the shared portion of the contents of the document is toward a center of the surface.

17. The computer program product of claim 5 further comprising computer program instructions capable of:
receiving, by the surface computer from the moderator, an instruction to terminate sharing the document; and
in response to receiving the instruction to terminate sharing, removing by the surface computer, the shared portion of the contents of the document from each of the participants' portions of the surface.

18. The computer program product of claim 5 wherein assigning, to each registered user, a portion of the surface for interaction between that registered user and the surface computer further comprises computer program instructions capable of:

receiving, by the surface computer from the moderator, an instruction to terminate sharing the document; and in response to receiving the instruction to terminate sharing, removing by the surface computer, the rendered portion of the content of the document from each of the participants' portions of the surface.

19. The computer program product of claim 5 wherein rendering the shared portion of the contents of the document on each of the participants' portions of the surface further comprises computer program instructions capable of orienting the shared portion of the contents of the document such that a top of the shared portion of the contents of the document is toward a center of the surface.

\* \* \* \* \*